US012800870B2

(12) United States Patent
Kanzaki

(10) Patent No.: US 12,800,870 B2
(45) Date of Patent: Nov. 17, 2026

(54) LENS UNIT

(71) Applicant: NIDEC INSTRUMENTS CORPORATION, Nagano (JP)

(72) Inventor: Yosuke Kanzaki, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 247 days.

(21) Appl. No.: 18/708,588

(22) PCT Filed: Nov. 11, 2022

(86) PCT No.: PCT/JP2022/042053

§ 371 (c)(1),
(2) Date: May 8, 2024

(87) PCT Pub. No.: WO2023/090266

PCT Pub. Date: May 25, 2023

(65) Prior Publication Data

US 2025/0013001 A1 Jan. 9, 2025

(30) Foreign Application Priority Data

Nov. 19, 2021 (JP) ................................ 2021-188393

(51) Int. Cl.
*G02B 7/02* (2021.01)

(52) U.S. Cl.
CPC ............. *G02B 7/026* (2013.01); *G02B 7/025* (2013.01)

(58) Field of Classification Search
CPC ......... G02B 7/025; G02B 7/021; G02B 7/026
USPC ........................................................... 359/830
See application file for complete search history.

(56) References Cited

U.S. PATENT DOCUMENTS

2018/0374740 A1 12/2018 Sato et al.
2019/0235193 A1* 8/2019 Komiyama ........ B29D 11/0073
2019/0310438 A1 10/2019 Komiyama
(Continued)

FOREIGN PATENT DOCUMENTS

CN 213517710 6/2021
JP 2007262320 10/2007
JP 2011120409 6/2011
(Continued)

OTHER PUBLICATIONS

"Search Report of Europe Counterpart Application", issued on Feb. 19, 2025, p. 1-p. 9.
(Continued)

*Primary Examiner* — Stephone B Allen
*Assistant Examiner* — Boutsikaris Leonidas
(74) *Attorney, Agent, or Firm* — JCIPRNET

(57) ABSTRACT

A lens unit includes a first lens disposed on an object side and a second lens disposed on an image side. A second flange surface of a second lens is provided with a convex portion. A first flange surface of the first lens is provided with facing portion inclined along an inclined portion. When Ra is an effective radius of the cemented lens, Ga is a first interval between a lens surface of the first lens and a lens surface of the second lens at the effective radius, Gb is a second interval that is three times the first interval, and Rb is an outer peripheral side radius where the second interval exists between the facing portion and the convex portion, the following conditional expression is satisfied.

$$1.100 < Rb/Ra$$

8 Claims, 5 Drawing Sheets

(56) References Cited

U.S. PATENT DOCUMENTS

2020/0073077 A1* 3/2020 Kanzaki .................. G02B 3/04

FOREIGN PATENT DOCUMENTS

| | | | |
|---|---|---|---|
| JP | 2011120409 A | * | 6/2011 |
| JP | 2018097019 | | 6/2018 |
| JP | 2018097294 | | 6/2018 |
| JP | 2020034675 | | 3/2020 |
| JP | 2021081745 | | 5/2021 |
| WO | 2017163409 | | 9/2017 |

OTHER PUBLICATIONS

"International Search Report (Form PCT/ISA/210) of PCT/JP2022/042053", mailed on Jan. 17, 2023, with English translation thereof, pp. 1-6.

* cited by examiner

LENS UNIT

CROSS-REFERENCE TO RELATED APPLICATION

This application is a 371 application of the International PCT application serial no. PCT/JP2022/042053, filed on Nov. 11, 2022, which claims the priority benefits of Japan Patent Application No. 2021-188393, filed on Nov. 19, 2021. The entirety of each of the above-mentioned patent applications is hereby incorporated by reference herein and made a part of this specification.

TECHNICAL FIELD

The present invention relates to a lens unit in which a plurality of lenses are held by a lens barrel.

BACKGROUND ART

In a lens unit in which a plurality of lenses are held by a lens barrel, a cemented lens may be used for the purpose of reducing aberration. The lens unit as above is described in, for example, Patent Literature 1. In this literature, a cemented lens in which a first lens and a second lens disposed on an image side of the first lens are bonded with an adhesive is used. The first lens includes a first lens surface located on the second lens side, and a first flange surface surrounding the first lens surface on the outer peripheral side. The second lens includes a second lens surface located on the first lens side and a second flange surface surrounding the second lens surface on the outer peripheral side. The adhesive is provided from between the first lens surface and the second lens surface to between the first flange surface and the second flange surface. An interval between the first flange surface and the second flange surface gradually becomes wider than an interval between the first lens surface and the second lens surface toward the outside in a radial direction.

CITATION LIST

Patent Literature

[Patent Literature 1] Japanese Unexamined Patent Application Publication No. 2018-97019

SUMMARY OF THE INVENTION

Problems to be Solved by the Invention

Herein, when the interval between the first flange surface and the second flange surface is wider than the interval between the first lens surface and the second lens surface, air is likely to be interposed in the adhesive. When a bubble portion in which air is interposed in the adhesive is close to the first lens surface and the second lens surface, the cemented lens is likely to be affected by light diffused by the bubble portion. Therefore, when light incident on the cemented lens is diffused by the bubble portion, there is a problem in that a ghost is likely to occur in the lens unit due to the diffused light. With respect to such a problem, Patent Literature 1 does not describe a positional relationship between the bubble portion and the first lens surface or the second lens surface, and it is difficult to solve this problem with the configuration described in Patent Literature 1.

In view of the above problems, an object of the present invention is to provide a lens unit capable of suppressing reflection of light incident on the periphery of a lens surface of a cemented lens in a specific direction.

Means for Solving the Problem

In order to solve the above-described problem, a lens unit according to the present invention is a lens unit including a plurality of lenses and a lens barrel for holding the plurality of lenses, the plurality of lenses including a first lens disposed on a first direction side and a second lens that is disposed on a second direction side being a direction opposite to the first direction side and that constitutes a cemented lens by being bonded to the first lens with an adhesive, the first lens including: a first lens surface having a concave shape facing the second lens; and a first flange surface surrounding the first lens surface on the outside in a radial direction, the second lens including: a second lens surface having a convex shape corresponding to the first lens surface and overlapping with the first lens surface; and a second flange surface surrounding the second lens surface on the outside in a radial direction, the second flange surface being formed with a convex portion protruding toward the first direction side, the first flange surface being formed with facing portion inclined along an inclined portion on the inside in a radial direction of the convex portion, the adhesive being provided from between the first lens surface and the second lens surface to an outside position in a radial direction beyond the facing portion and the convex portion, and when Ra is an effective radius of the cemented lens, Ga is a first interval between the first lens surface and the second lens surface at the effective radius Ra, Gb is a second interval that is three times the first interval Ga, and Rb is an outer peripheral side radius where the second interval Gb exists between the facing portion and the convex portion, the following conditional expression:

$$1.100<Rb/Ra$$

is satisfied.

According to the present invention, as for the cemented lens, when Ra is an effective radius of the cemented lens, Ga is a first interval between the first lens surface and the second lens surface at the effective radius Ra, Gb is a second interval that is three times the first interval Ga, and Rb is an outer peripheral side radius where the second interval Gb exists between the facing portion and the convex portion, the following conditional expression:

$$1.100<Rb/Ra$$

is satisfied. Herein, in the second interval Gb that is three times the first interval Ga, air is likely to be interposed in the adhesive, and a bubble portion is likely to be generated. Therefore, in this way, the bubble portion in which air is interposed in the adhesive can be set at an appropriate position from the effective radius of the cemented lens. As a result, in the present invention, it is possible to suppress the occurrence of a ghost due to the diffusion of light in the bubble portion in which air is interposed in the adhesive. Accordingly, in a case where the value of the conditional expression exceeds a lower limit, the bubble portion in which air is interposed in the adhesive is close to the first lens surface and the second lens surface, and is affected by diffusion of light in the bubble portion, and thus a ghost is likely to occur in the lens unit.

In the present invention, it is preferable that as for the lens unit, when Ra is an effective radius of the cemented lens, Ga is a first interval between the first lens surface and the second lens surface at the effective radius Ra, Gb is a second interval that is three times the first interval Ga, and Rb is an outer peripheral side radius where the second interval Gb exists between the facing portion and the convex portion, the following conditional expression:

$$1.100<Rb/Ra<1.500$$

is satisfied. In this way, it is possible to reduce the influence of a ghost due to diffusion of light in the bubble portion in which air is interposed in the adhesive, and to suppress an increase in size of the lens unit. Accordingly, when the value of the conditional expression exceeds an upper limit, the cemented lens becomes large, and therefore, the lens unit increases in size.

In the present invention, it is preferable that an interval between the facing portion and the convex portion becomes wider toward the outside in the radial direction from a first boundary portion between the first lens surface and the facing portion and a second boundary portion between the second lens surface and the inclined portion. In this way, when the first lens and the second lens are bonded to each other, an excess adhesive between the first lens surface and the second lens surface is easily and smoothly discharged toward the outside in the radial direction.

In the present invention, it is preferable that the first lens surface and the facing portion are continuous while being curved, and the second lens surface and the inclined portion of the convex portion are continuous while being curved. In this way, when an excess adhesive between the first lens surface and the second lens surface flows into an adhesive reservoir, air bubbles are unlikely to be generated in the adhesive.

In the present invention, it is preferable that the first flange surface is provided with an adhesive reservoir recessed toward the first direction side, and the adhesive reservoir is provided with the facing portion on the inside in a radial direction. In this way, when the first lens and the second lens are bonded to each other, an excess adhesive 8 between the first lens surface and the second lens surface is accumulated in the adhesive reservoir. For this reason, it is possible to apply a sufficient amount of adhesive in such a way as that the adhesive is not interrupted or air bubbles are not generated. In addition, it is possible to suppress the adhesive from flowing out to the outside of the cemented lens.

In the present invention, it is preferable that the adhesive reservoir includes a bottom portion, which is continuous with the facing portion and faces the second direction side, and the bottom portion is curved toward the first direction side. In this way, when the adhesive flows into the adhesive reservoir, air bubbles are less likely to be generated in the adhesive.

In the present invention, it is preferable that a center of the bottom portion in a radial direction is located on the outside in the radial direction from the convex portion. In this way, the adhesive reservoir extends to the outside in the radial direction from the convex portion. Thus, when viewed from an optical axis direction, an adhesion area of the adhesive can be increased, and therefore it is easy to secure a bonding strength between the first lens and the second lens.

In the present invention, it is preferable that the second flange surface is provided with a step portion protruding toward the first direction side, and the adhesive reservoir is provided with an abutment surface portion that linearly extends from the outside in a radial direction of the bottom portion toward the second direction side and abuts on the step portion from the outside in a radial direction. In this way, when the first lens and the second lens are bonded to each other, the abutment surface portion and the step portion abut on each other in the radial direction, and therefore optical axes L of the first lens and the second lens are aligned with each other.

In the present invention, in the first flange surface and the second flange surface, a polished surface subjected to polishing processing is provided in a portion where the adhesive is provided. In this way, since the polished surface, which is the portion where the adhesive is provided, is polished, the surface is smooth. Therefore, since the adhesive easily adheres to the surface, the first lens and the second lens are hardly separated from each other.

Effect of the Invention

In the present invention, when Ra is an effective radius of the cemented lens, Ga is a first interval between the first lens surface and the second lens surface at the effective radius Ra, Gb is a second interval that is three times the first interval Ga, and Rb is an outer peripheral side radius where the second interval Gb exists between the facing portion and the convex portion, the following conditional expression:

$$1.100<Rb/Ra$$

is satisfied. Thus, in the lens unit including the cemented lens, it is possible to suppress the occurrence of a ghost due to diffusion of light in the bubble portion of the adhesive.

MODE FOR CARRYING OUT THE INVENTION

Figure 1:
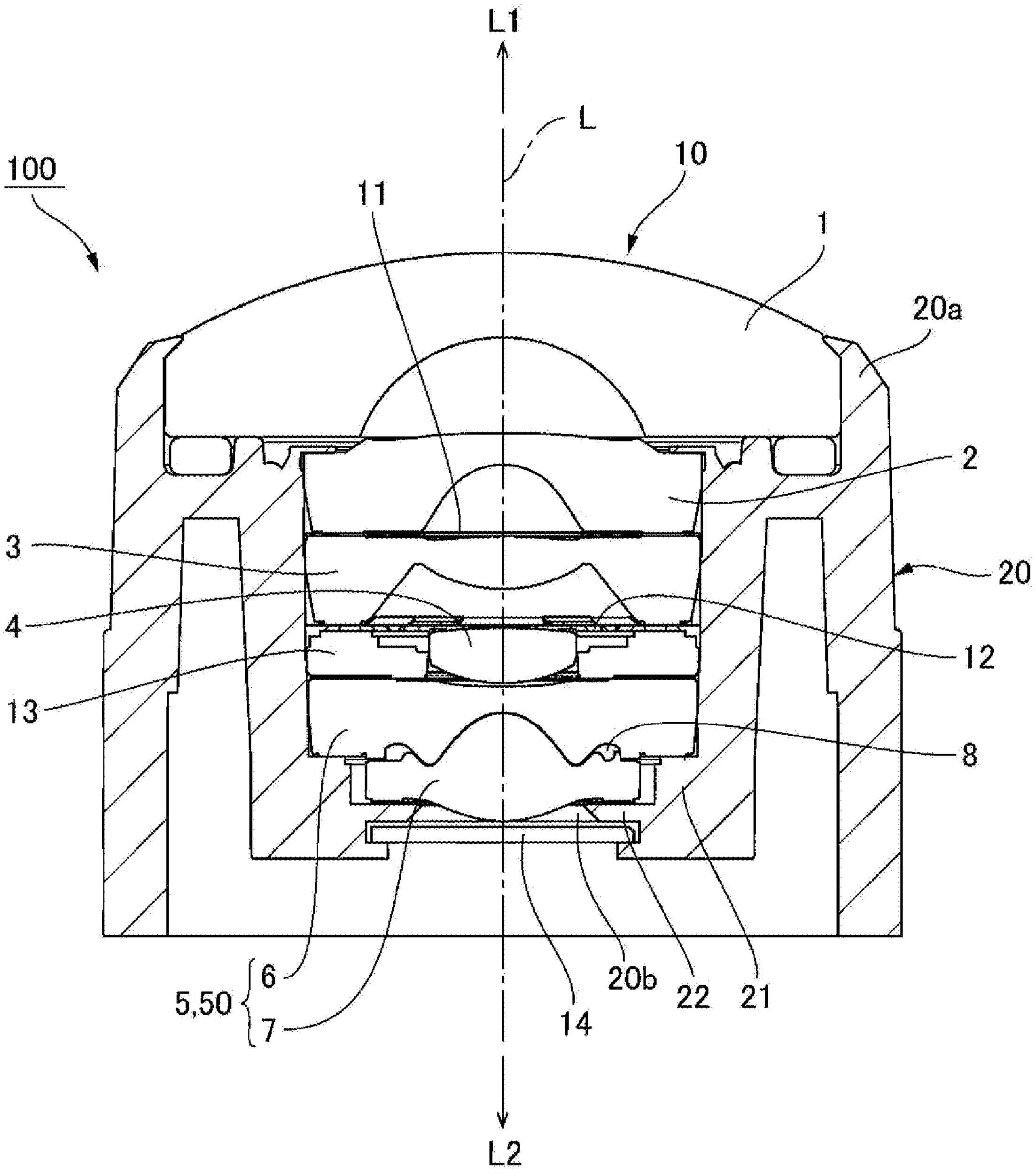
FIG. 1 is a cross-sectional view of a lens unit to which the present invention is applied.

Hereinafter, explanation is made on an embodiment of the present invention with reference to the drawings. Note that, in the drawings referred to in the following explanation, the number and scale of each member vary in order to make each member recognizable in the drawings. In addition, in the following explanation, L1 is added to an object side and L2 is added to an image side in a direction of an optical axis L in which the optical axis L extends.

(Lens Unit)

FIG. 1 is a cross-sectional view of a lens unit to which the present invention is applied. A lens unit 100 according to the present embodiment is used in an optical apparatus such as an imaging apparatus. The lens unit 100 has substantially the same configuration around the entire optical axis L. The lens unit 100 illustrated in FIG. 1 includes a plurality of lenses 10 and a lens barrel 20 that holds the plurality of lenses 10. An imaging element is provided on an image side L2 of the lens barrel 20. The imaging element is a CMOS or the like.

As illustrated in FIG. 1, the plurality of lenses 10 are disposed along the optical axis L. The plurality of lenses 10 include a lens 1, a lens 2, a lens 3, a lens 4, and a lens 5. The lens 1 is disposed closest to the object side (first direction side) L1, and the lens 5 is disposed closest to the image side (second direction side) L2. The lens 4 is held by the lens barrel 20 in a state of being held by the holder 13. In this embodiment, the lens 1 is disposed in such a way as to close an object side opening 20*a* of the lens barrel 20. A translucent plate-shaped member 14 located closest to the image side L2 is disposed in such a way as to close an image side opening 20*b* of the lens barrel 20.

The lens 1 has a convex shape on a lens surface of the object side L1 and a concave shape on a lens surface of the image side L2. The lens 2 has a convex shape on the lens surface of the object side L1, and has a concave shape on the lens surface of the image side L2. The lens 3 has a convex shape on the lens surface of the object side L1 and has a convex shape on the lens surface of the image side L2. The lens 4 has a convex shape on the lens surface of the object side L1, and has a convex shape on the lens surface of the image side L2. The lens 5 has a concave shape on the lens surface of the object side L1, and has a convex shape on the lens surface of the image side L2. The lens 5 is formed of a cemented lens 50.

The lens unit 100 includes an annular light shielding sheet 11 between the lens 2 and the lens 3. The lens unit 100 includes an annular diaphragm 12 between the lens 4 and the lens 5.

(Cemented Lens 50)

Figure 2:
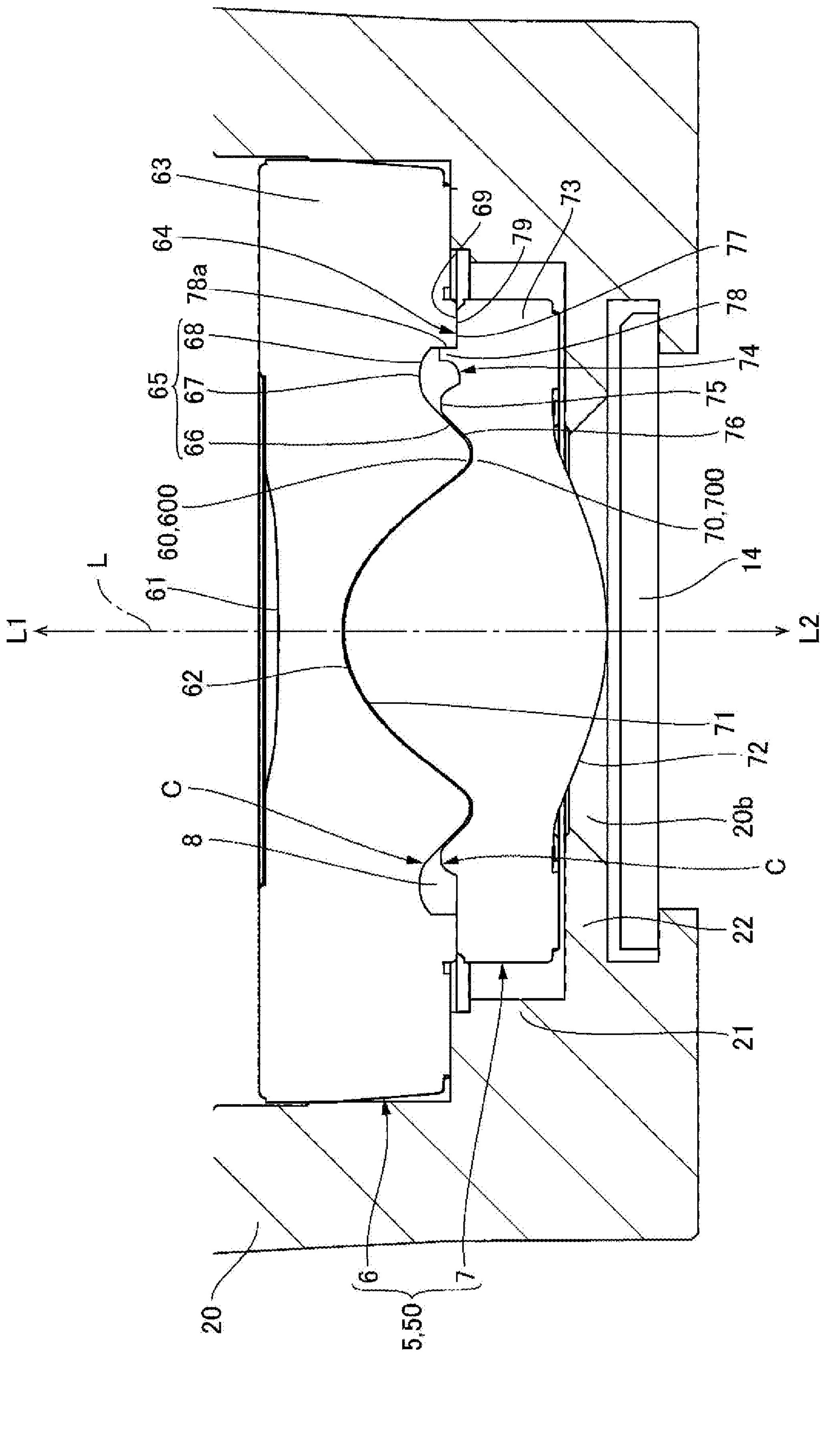
FIG. 2 is a cross-sectional view of a cemented lens.
Figure 3:
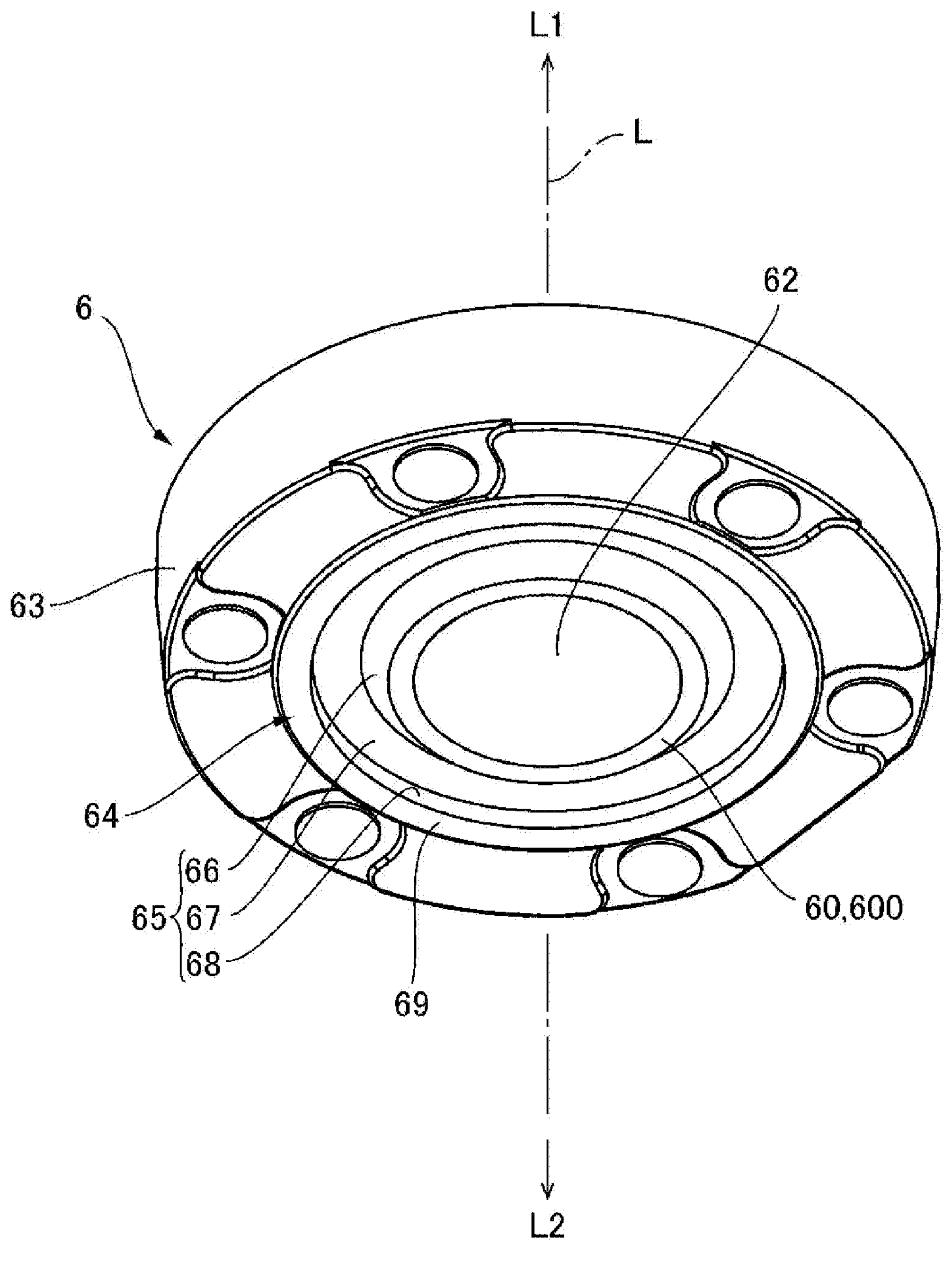
FIG. 3 is a perspective view of a first lens.
Figure 4:
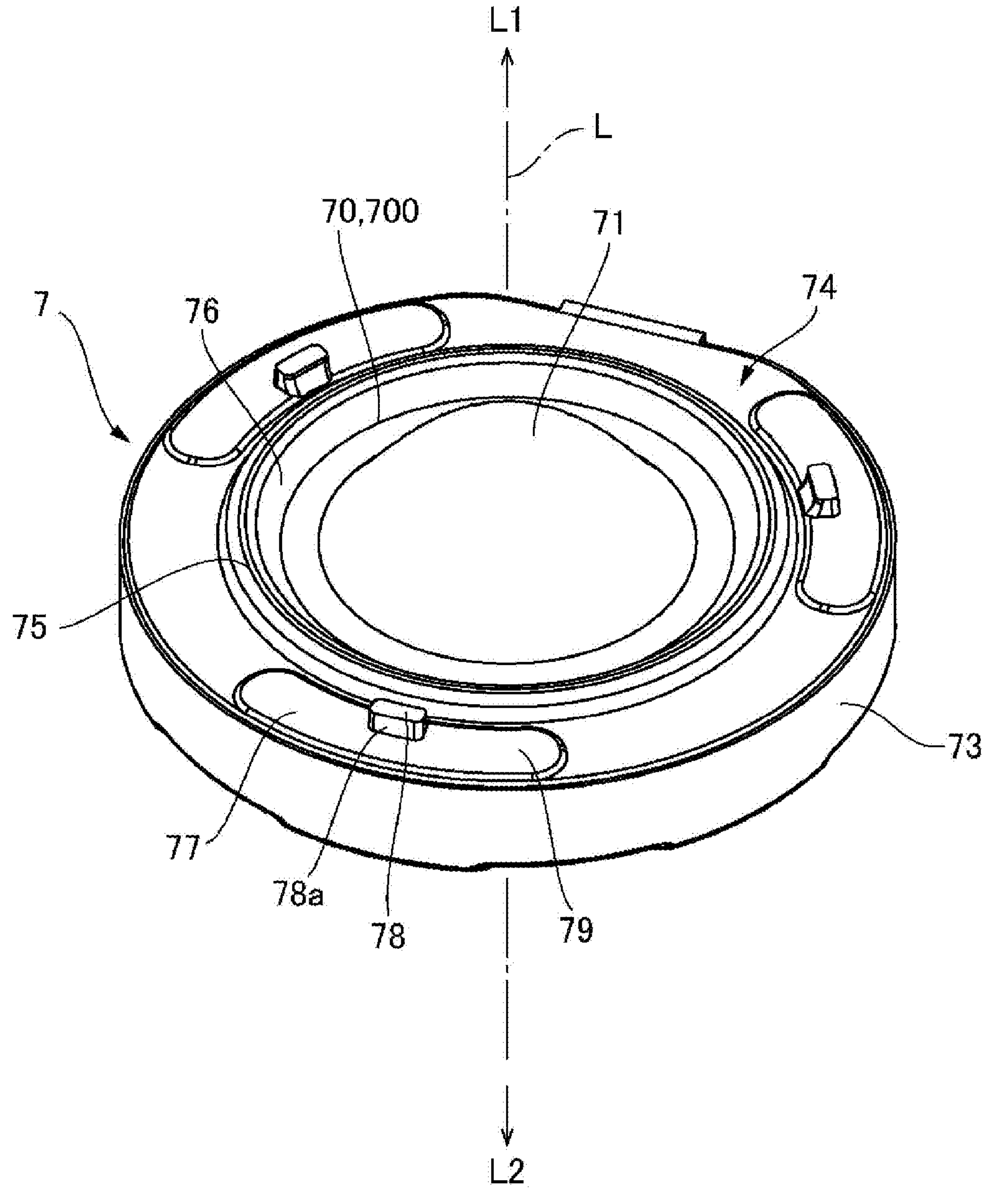
FIG. 4 is a perspective view of a second lens.

FIG. 2 is a cross-sectional view of the cemented lens 50. FIG. 3 is a perspective view of a first lens 6. FIG. 4 is a perspective view of a second lens 7. As illustrated in FIGS. 1 and 2, the cemented lens 50 includes a first lens 6 disposed on the object side L1 (first direction side), and a second lens 7 disposed on the image side L2 (second direction side) which is an opposite side (opposite direction) to the object side L1. The first lens 6 and the second lens 7 are bonded with an adhesive 8. In the present embodiment, the adhesive 8 is a UV-curable adhesive. The adhesive 8 is preferably a material having elasticity even after curing.

The first lens 6 is made of resin. As illustrated in FIGS. 2 and 3, the first lens 6 has a concave shape on a lens surface 61 on the object side L1, and has a concave shape on a lens surface 62 (first lens surface) on the image side L2. The first lens 6 includes a first flange portion 63 that surrounds the lens surface 61 and the lens surface 62 on the outside in a radial direction. Therefore, the first lens 6 is provided with a first flange surface 64 that surrounds the lens surface 62 on the outside in the radial direction.

The second lens 7 is made of resin. As illustrated in FIGS. 2 and 4, the second lens 7 has a convex shape on a lens surface 71 (second lens surface) on the object side L1, and has a convex shape on a lens surface 72 on the image side L2. The second lens 7 includes a second flange portion 73 that surrounds the lens surface 71 and the lens surface 72 on the outside in a radial direction. Therefore, the second lens 7 is provided with a second flange surface 74 that surrounds the lens surface 71 on the outside in the radial direction. The lens surface 71 has a convex shape corresponding to the lens surface 62 and overlaps with the lens surface 62. The lens surface 71 has a radius of curvature substantially equal to that of the lens surface 62.

Figure 5:
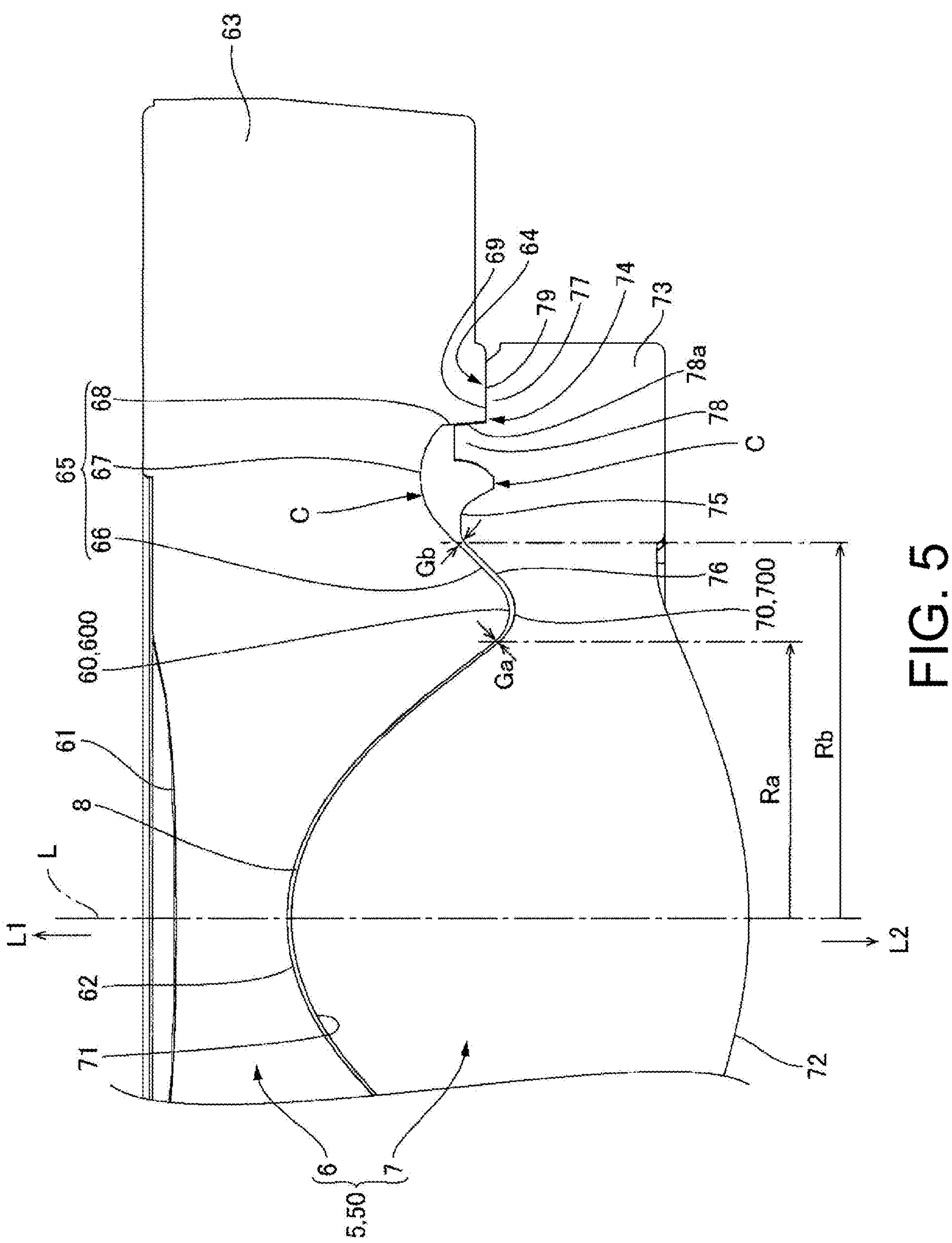
FIG. 5 is an enlarged cross-sectional view illustrating an end portion of a cemented lens.

The second flange surface 74 is provided with a convex portion 75 that is adjacent to the lens surface 71 and protrudes toward the object side L1. As illustrated in FIG. 5, the convex portion 75 extends annularly. The convex portion 75 has an arc-shaped cross section. An inclined portion 76 on the inside in a radial direction of the convex portion 75 and the lens surface 71 are continuous while being curved. In other words, the inclined portion 76 and the lens surface 71 are continuous via a curved surface 70 curved toward the image side L2.

The second flange surface 74 is provided with an attachment surface portion 77 protruding toward the object side L1 on the outside in the radial direction from the convex portion 75. As illustrated in FIG. 5, three attachment surface portions 77 extend in the circumferential direction and are provided at equal intervals in the circumferential direction. A flat surface 79 facing the object side L1 of the attachment surface portion 77 intersects the optical axis L. The flat surface 79 of the attachment surface portion 77 abuts on the first flange surface 64 when the first lens 6 and the second lens 7 are bonded to each other. Each of the attachment surface portions 77 is provided with a step portion 78 protruding toward the object side L1. A width of the step portion 78 in the circumferential direction is narrower than a width of the attachment surface portion 77 in the circumferential direction. When the first lens 6 and the second lens 7 are bonded to each other, the step portion 78 is inserted into an adhesive reservoir 65 to be described later, and abuts on an abutment surface portion 68 of the adhesive reservoir 65 from the inside in the radial direction.

As illustrated in FIGS. 2 and 3, the first flange surface 64 is provided with the adhesive reservoir 65 that is adjacent to the lens surface 62 and is recessed toward the object side L1. The adhesive reservoir 65 extends annularly. When the first lens 6 and the second lens 7 are bonded to each other, the convex portion 75 is inserted into the adhesive reservoir 65. The adhesive reservoir 65 includes a facing portion 66 located on the inside in the radial direction, a bottom portion 67 being continuous with the facing portion 66 and facing the image side L2, and an abutment surface portion 68 extending from the outside in the radial direction of the bottom portion 67 toward the image side L2.

The facing portion 66 is adjacent to the lens surface 62 and is inclined along the inclined portion 76. The facing portion 66 and the lens surface 62 are continuous while being curved. In other words, the facing portion 66 and the lens surface 62 are continuous with each other via the curved surface 60, which is curved toward the image side L2.

The bottom portion 67 is curved toward the object side L1. The center of the bottom portion 67 in the radial direction is located on the outside in the radial direction from the convex portion 75. Accordingly, the adhesive reservoir 65 extends to the outside in the radial direction from the convex portion 75. The abutment surface portion 68 extends linearly toward the image side L2. When the first lens 6 and the second lens 7 are bonded to each other, the abutment surface portion 68 abuts on a side surface 78*a* on the outside in the radial direction of the step portion 78, in the radial direction.

The first flange surface 64 is provided with a flat surface 69, which intersects the optical axis L, on the outside in the radial direction from the adhesive reservoir 65. The flat surface 69 abuts on the flat surface 79 of the attachment surface portion 77 when the first lens 6 and the second lens 7 are bonded to each other.

As illustrated in FIG. 2, the adhesive 8 is provided between the first lens 6 and the second lens 7 including between the lens surface 62 and the lens surface 71 and between the first flange surface 64 and the second flange surface 74. More specifically, the adhesive 8 is provided from between the lens surface 62 and the lens surface 71 to a position on the outside in the radial direction beyond the facing portion 66 and the inclined portion 76. Herein, in the first flange surface 64 and the second flange surface 74, a polished surface C is provided in a portion where the adhesive 8 is provided. The polished surface C is polished to the same degree as mirror finish by machining.

As illustrated in FIG. 2, in this embodiment, an outer diameter of the first lens 6 is larger than that of the second lens 7. Therefore, an outer peripheral portion of the first flange portion 63 protrudes to the outside in the radial direction from the second flange portion 73. On the other hand, in the lens barrel 20, a step portion 21 is formed which supports, on the image side L2, the outer peripheral portion of the first flange portion 63, which protrudes to the inside in the radial direction from the second flange portion 73. In addition, in the lens barrel 20, an annular end plate portion 22 protrudes to the inside in the radial direction from the step portion 21 on the image side L2. Herein, the image side opening 20*b* is formed in the central portion of the end plate portion 22, and the translucent plate-shaped member 14 is fixed to an end surface of the image side L2 of the end plate portion 22.

(Details about Bonding Lens with Adhesive)

The bonding of the first lens 6 and the second lens 7 with the adhesive 8 will be explained. FIG. 5 is a cross-sectional view illustrating an enlarged end portion of the cemented lens 50.

In this embodiment, when the first lens 6 and the second lens 7 are bonded to each other, for example, after the adhesive 8 is applied to the lens surface 62 side of the first lens 6, the first lens 6 and the second lens 7 are overlapped with each other. As a result, as illustrated in FIG. 5, since the adhesive 8 spreads between the first lens 6 and the second lens 7, when the adhesive 8 is cured thereafter, the first lens 6 and the second lens 7 are bonded to each other by the adhesive 8. In the bonding processing, when the adhesive 8 spreads between the first lens 6 and the second lens 7, the adhesive 8 tends to flow out from between the first lens 6 and the second lens 7, but the adhesive 8 is accumulated in the adhesive reservoir 65. Therefore, it is possible to reduce an amount of the adhesive 8 that flows out from between the first lens 6 and the second lens 7 to the outside, and therefore an interrupted portion of the adhesive 8 is unlikely to occur between the first lens 6 and the second lens 7.

When the first lens 6 and the second lens 7 are bonded to each other, the flat surface 69 abuts on the flat surface 79, whereby the first lens 6 and the second lens 7 are positioned in the direction of the optical axis L. In addition, when the first lens 6 and the second lens 7 are bonded to each other, the abutment surface portion 68 and the side surface 78*a* abut on each other, whereby the optical axes L of the first lens 6 and the second lens 7 are aligned with each other. Thus, an interval between the first lens 6 and the second lens 7 can be controlled to an appropriate dimension. Therefore, an interrupted portion of the adhesive 8 is unlikely to occur between the first lens 6 and the second lens 7. In addition, the interval between the facing portion 66 and the convex portion 75 becomes wider toward the outside in the radial direction from a first boundary portion 600 between the lens surface 62 and the facing portion 66 and a second boundary portion 700 between the lens surface 71 and the inclined portion 76. Thus, when the first lens 6 and the second lens 7 are bonded to each other, the excess adhesive 8 between the lens surface 62 and the lens surface 71 is easily and smoothly discharged toward the adhesive reservoir 65.

As illustrated in FIG. 5, in the cemented lens 50, when Ra is an effective radius of the cemented lens 50, Ga is a first interval between the lens surface 62 and the lens surface 71 at the effective radius Ra, Gb is a second interval that is three times the first interval Ga, and Rb is an outer peripheral side radius where the second interval Gb exists between the facing portion 66 and the convex portion 75, the following conditional expression:

$$1.100<Rb/Ra<1.500$$

is satisfied. In the present embodiment, the effective radius Ra is 1.27 mm, the first interval Ga is 0.012 mm, the second interval Gb is 0.038 mm, and the outer peripheral side radius Rb is 1.724 mm. Therefore, Rb/Ra is 1.358.

(Operation Effect)

In the lens unit 100 of the embodiment, when Ra is an effective radius of the cemented lens 50, Ga is a first interval between the lens surface 62 and the lens surface 71 at the effective radius Ra, Gb is a second interval that is three times the first interval Ga, and Rb is an outer peripheral side radius where the second interval Gb exists between the facing portion 66 and the convex portion 75, the following conditional expression:

$$1.100<Rb/Ra<1.500$$

is satisfied. Herein, in the second interval Gb, which is three times the first interval Ga, air is likely to be interposed in the adhesive 8, and a bubble portion is likely to be generated. Therefore, in this embodiment, since the above-described conditional expression is satisfied, the bubble portion in which air is interposed in the adhesive 8 can be set at an appropriate position from the effective radius Ra of the cemented lens 50. As a result, in the lens unit 100 including the cemented lens 50, occurrence of a ghost due to diffusion of light in the bubble portion in which air is interposed in the adhesive 8 is suppressed. Accordingly, in a case where the value of the conditional expression exceeds a lower limit, the bubble portion in which air is interposed in the adhesive 8 is closer to the lens surface 62 and the lens surface 71, and is affected by diffusion of light in the bubble portion. Therefore, a ghost is likely to occur in the lens unit 100. When the value of the conditional expression exceeds an upper limit, the cemented lens 50 becomes large, and therefore the lens unit 100 increases in size.

In this embodiment, the interval between the facing portion 66 and the convex portion 75 becomes wider toward the outside in the radial direction from a first boundary portion 600 between the lens surface 62 and the facing portion 66 and a second boundary portion 700 between the lens surface 71 and the inclined portion 76. Thus, when the first lens 6 and the second lens 7 are bonded to each other, the excess adhesive 8 between the lens surface 62 and the lens surface 71 is easily and smoothly discharged toward the adhesive reservoir 65.

In this embodiment, the lens surface 62 and the facing portion 66 are continuous while being curved. In addition, the lens surface 72 and the inclined portion 76 of the convex portion 75 are continuous while being curved. Therefore, when the excess adhesive 8 between the lens surface 62 and the lens surface 71 flows into the adhesive reservoir 65, air bubbles are unlikely to be generated in the adhesive 8.

The first flange surface 64 is provided with an adhesive reservoir 65 recessed toward the object side L1. The adhesive reservoir 65 includes a facing portion 66 adjacent to the first lens surface 62 on the inside in the radial direction. Thus, when the first lens 6 and the second lens 7 are bonded to each other, the excess adhesive 8 between the lens surface 62 and the lens surface 71 is accumulated in the adhesive reservoir 65. For this reason, it is possible to apply a sufficient amount of the adhesive 8 in such a way that the adhesive 8 is not interrupted or air bubbles are not generated. In addition, it is possible to suppress the adhesive 8 from flowing out to the outside of the cemented lens 50.

In this embodiment, the adhesive reservoir 65 includes a bottom portion 67 which is continuous with the facing portion 66, faces the image side L2, and is curved toward the object side L1. Thus, when the adhesive 8 flows into the adhesive reservoir 65, air bubbles are unlikely to be generated in the adhesive 8.

The center of the bottom portion 67 in the radial direction is located on the outside in the radial direction from the convex portion 75. Accordingly, the adhesive reservoir 65 extends to the outside in the radial direction from the convex portion 75. In this way, when viewed from a direction of the optical axis L, it is possible to increase an adhesion area of the adhesive 8, and therefore it is easy to secure a bonding strength between the first lens 6 and the second lens 7.

The second flange surface 74 is provided with a step portion 78 protruding toward the object side L1. The adhesive reservoir 65 includes an abutment surface portion 68 that linearly extends from the outside in the radial direction of the bottom portion 67 toward the image side L2 and abuts on the side surface 78*a* of the step portion 78 from the outside in the radial direction. Therefore, when the first lens 6 and the second lens 7 are bonded to each other, the abutment surface portion 68 and the side surface 78*a* abut on each other in the radial direction, and therefore the optical axes L of the first lens 6 and the second lens 7 are aligned with each other.

Further, in the present embodiment, a polished surface C is provided in a portion where the adhesive 8 is provided in the first flange surface 64 and the second flange surface 74. The polished surface C is polished to the same degree as mirror finish by machining. Herein, in a case where the first flange surface 64 and the second flange surface 74 are not polished, the adhesive 8 is unlikely to flow into the details of the unevenness of the surfaces, and therefore the adhesive 8 is unlikely to adhere to the surfaces. Therefore, the first lens 6 and the second lens 7 are easily separated from each other. On the other hand, in the present embodiment, the polished surface C, which is a portion where the adhesive 8 is provided, is polished, and therefore the surface is smooth. Therefore, since the adhesive 8 easily adheres to the surface, the first lens 6 and the second lens 7 are hardly separated from each other.

Another Embodiment

In the above-described embodiment, the first lens 6 is disposed on the object side L1 (first direction side), and the second lens 7 is disposed on the image side L2 (second direction side), but the first lens 6 may be disposed on the image side L2 (second direction side), and the second lens 7 may be disposed on the object side L1 (first direction side).

In the above-described embodiment, in the first flange surface 64 and the second flange surface 74, the polished surface C is provided in the portion where the adhesive 8 is provided, but the polished surface C may not be provided.

DESCRIPTION OF REFERENCE NUMERALS

1 . . . LENS
2 . . . LENS
3 . . . LENS
4 . . . LENS
5 . . . LENS
6 . . . FIRST LENS
7 . . . SECOND LENS
8 . . . ADHESIVE
10 . . . A PLURALITY OF LENSES
11 . . . LIGHT SHIELDING SHEET
12 . . . DIAPHRAGM
13 . . . HOLDER
14 . . . TRANSLUCENT PLATE-SHAPED MEMBER
20 . . . LENS BARREL
20*a* . . . OBJECT SIDE OPENING
20*b* . . . IMAGE SIDE OPENING
21 . . . STEP PORTION
22 . . . END PLATE PORTION
50 . . . CEMENTED LENS
60 . . . CURVED SURFACE
61 . . . LENS SURFACE
62 . . . LENS SURFACE (FIRST LENS SURFACE)
63 . . . FIRST FLANGE PORTION
64 . . . FIRST FLANGE SURFACE
65 . . . ADHESIVE RESERVOIR
66 . . . FACING PORTION
67 . . . BOTTOM PORTION
68 . . . ABUTMENT SURFACE PORTION
69 . . . FLAT SURFACE
70 . . . CURVED SURFACE
71 . . . LENS SURFACE (SECOND LENS SURFACE)
72 . . . LENS SURFACE
73 . . . SECOND FLANGE PORTION
74 . . . SECOND FLANGE SURFACE
75 . . . CONVEX PORTION
76 . . . INCLINED PORTION
77 . . . ATTACHMENT SURFACE PORTION
78 . . . STEP PORTION
78*a* . . . SIDE SURFACE
79 . . . FLAT SURFACE
100 . . . LENS UNIT
600 . . . FIRST BOUNDARY PORTION
700 . . . SECOND BOUNDARY PORTION
C . . . POLISHED SURFACE
Ga . . . FIRST INTERVAL
Gb . . . SECOND INTERVAL
L . . . OPTICAL AXIS
L1 . . . OBJECT SIDE (FIRST DIRECTION SIDE)
L2 . . . IMAGE SIDE (SECOND DIRECTION SIDE)
Ra . . . EFFECTIVE RADIUS
Rb . . . OUTER PERIPHERAL SIDE RADIUS

The invention claimed is:

1. A lens unit comprising a plurality of lenses and a lens barrel for holding the plurality of lenses, the plurality of lenses including: a first lens disposed on a first direction side and a second lens disposed on a second direction side that is a direction opposite to the first direction side, the second lens constituting a cemented lens by being bonded to the first lens with an adhesive, the first lens including: a first lens surface having a concave surface shape facing the second lens side; and a first flange surface surrounding the first lens surface on an outside in a radial direction, the second lens including: a second lens surface that has a convex surface shape corresponding to the first lens surface and overlaps with the first lens surface; and a second flange surface surrounding the second lens surface on an outside in a radial direction, the second flange surface being formed with a convex portion protruding toward the first direction side, the first flange surface being formed with a facing portion inclined along an inclined portion on an inside in a radial direction of the convex portion, the adhesive being provided from between the first lens surface and the second lens surface to an outside position in a radial direction beyond the facing portion and the convex portion, the lens unit satisfying the following conditional expression:

$$1.100 < Rb/Ra$$

when Ra is an effective radius of the cemented lens,

Ga is a first interval between the first lens surface and the second lens surface at the effective radius Ra, Gb is a second interval that is three times the first interval Ga, and Rb is an outer peripheral side radius where the second interval Gb exists between the facing portion and the convex portion, wherein the first flange surface is provided with an adhesive reservoir recessed toward the first direction side, the adhesive reservoir includes the facing portion on an inside in a radial direction, and the adhesive reservoir includes a bottom portion that is continuous with the facing portion and faces the second direction side, wherein a center of the bottom portion in a radial direction is located on the outside in a radial direction from the convex portion.

2. The lens unit according to claim 1, wherein when Ra is an effective radius of the cemented lens, Ga is a first interval between the first lens surface and the second lens surface at the effective radius Ra, Gb is a second interval that is three times the first interval Ga, and Rb is an outer peripheral side radius where the second interval Gb exists between the facing portion and the convex portion, the following conditional expression is satisfied.

$$1.100 < Rb/Ra < 1.500$$

3. The lens unit according to claim 1, wherein an interval between the facing portion and the convex portion becomes wider toward the outside in a radial direction from a first boundary portion between the first lens surface and the facing portion and a second boundary portion between the second lens surface and the inclined portion.

4. The lens unit according to claim 1, wherein the first lens surface and the facing portion are continuous while being curved, and the second lens surface and the inclined portion of the convex portion are continuous while being curved.

5. The lens unit according to claim 1, wherein the second flange surface includes a step portion protruding toward the first direction side, and the adhesive reservoir includes an abutment surface portion that linearly extends from the outside in the radial direction of the bottom portion toward the second direction side and abuts on the step portion from the outside in the radial direction.

6. The lens unit according to claim 1, wherein the first flange surface and the second flange surface are provided with a polished surface subjected to polishing in a portion where the adhesive is provided.

7. The lens unit according to claim 4, wherein the first flange surface is provided with an adhesive reservoir recessed toward the first direction side, and the adhesive reservoir includes the facing portion on an inside in a radial direction.

8. The lens unit according to claim 1, wherein the second flange surface includes a step portion protruding toward the first direction side, and the adhesive reservoir includes an abutment surface portion that linearly extends from the outside in the radial direction of the bottom portion toward the second direction side and abuts on the step portion from the outside in the radial direction.

* * * * *